United States Patent [19]
Tyren

[11] Patent Number: 6,018,297
[45] Date of Patent: Jan. 25, 2000

[54] METHOD AND DEVICE FOR CODING ELECTRONIC LABELS

[75] Inventor: Carl Tyren, Antibes, France

[73] Assignee: RSO Corporation N.V., Curacao AN, Netherlands

[21] Appl. No.: 08/737,761

[22] PCT Filed: Apr. 25, 1995

[86] PCT No.: PCT/SE95/00452

§ 371 Date: Dec. 16, 1996

§ 102(e) Date: Dec. 16, 1996

[87] PCT Pub. No.: WO95/29467

PCT Pub. Date: Nov. 2, 1995

[30] Foreign Application Priority Data

Apr. 26, 1994 [SE] Sweden ................... 9401449

[51] Int. Cl.⁷ ................................. G08B 13/14
[52] U.S. Cl. ................... 340/572.4; 340/572.7
[58] Field of Search ................. 340/572, 551, 340/825.34, 825.31, 825.54, 505, 572.1, 572.5, 572.4, 572.7; 235/385, 382, 380

[56] References Cited

U.S. PATENT DOCUMENTS

| | | | |
|---|---|---|---|
| 4,492,922 | 1/1985 | Ohkubo | 324/207 |
| 4,647,917 | 3/1987 | Anderson, III et al. | 340/572 |
| 4,704,602 | 11/1987 | Asbrink | 340/572 X |
| 4,710,752 | 12/1987 | Cordery | 340/572 X |
| 5,005,001 | 4/1991 | Cordery | 340/572 X |
| 5,049,857 | 9/1991 | Plonsky et al. | 340/572 X |
| 5,160,888 | 11/1992 | Laukien | 324/309 |
| 5,300,922 | 4/1994 | Stoffer | 340/572 |
| 5,397,986 | 3/1995 | Conway et al. | 324/243 |
| 5,420,569 | 5/1995 | Dames et al. | 340/572 |
| 5,551,158 | 9/1996 | Tyren et al. | 340/551 X |
| 5,576,693 | 11/1996 | Tyren et al. | 340/572 |
| 5,621,316 | 4/1997 | Dames et al. | 324/207.13 |

FOREIGN PATENT DOCUMENTS

| | | |
|---|---|---|
| 96182 | 12/1983 | European Pat. Off. . |
| 21 67 627 | 5/1986 | United Kingdom . |
| 88/01427 | 2/1988 | WIPO . |
| 93/04538 | 3/1993 | WIPO . |
| 9314370 | 7/1993 | WIPO . |
| 9314478 | 7/1993 | WIPO . |
| 95/29467 | 11/1995 | WIPO . |

*Primary Examiner*—Thomas Mullen
*Attorney, Agent, or Firm*—Merchant & Gould P.C.

[57] ABSTRACT

A method for coding remotely detectable labels (10), whereby at least two elements (18, 19), the characteristics of which being changed by an external magnetic field, are arranged to form a label (10), the label (10) is exposed to a biasing magnetic field covering an interrogation volume (11), that is larger than the label, and the resonance frequency of the elements (18, 19), which is changed by the magnetizing field strength (H) of the magnetic field, is detected. The elements on each label (10) are oriented in predetermined angular relations with respect to each other so as to provide an identity for the label (10) determined by the angular relations, and the elements are exposed to a sequence of different field conditions. All possible combinations of as many magnetic field components as there are elements are compiled, and the magnetic field components are arranged in possible angular relations in the label (10). All angular relations or codes, which may be correct for different element combinations, are determined, and the determination is repeated until only one code for each unique element combination remains.

1 Claim, 2 Drawing Sheets

METHOD AND DEVICE FOR CODING ELECTRONIC LABELS

FIELD OF THE INVENTION

For remote detection of passive and simple elements different types of magneto-mechanical elements may be used, the magnetic and mechanical properties of which being influenced by an external magnetic field, a so-called bias field.

The elements are forced into states of mechanical self-oscillation, the elements thereby emitting and/or affecting a magnetic field in a detectable way.

DESCRIPTION OF THE PRIOR ART

Elements, which exhibit a comparatively large magneto-mechanical coupling, are suitable. The resonance frequency of these elements changes due to the so-called Δ-E effect with the magnetic flux intensity along the main direction of the element.

WO 93/14478 discloses and describes a method and a device for coding and detection of remotely detectable gauges. A number of magnetic elements of an amorphous material are placed upon each other on a label with a certain angular displacement, the angular position thereby constituting one "bit" or code position. According to the coding method the angles between the amorphous elements in the label are used to define the code position. Accordingly, each element may be arranged to represent any code value within a predetermined number range. The expression "label" mentioned above generally refers to information carriers in the form of several magnetic elements.

The method is based upon the use of at least one reference element, which is used to determine the angular positions of the rest of the elements. Thus, the effective range of actual codes is decreased.

BRIEF SUMMARY OF THE INVENTION

An object with the present invention is to provide a method and a device for coding and detection of magnetic elements, where all of the elements are used as coding elements. Further objects and advantages are obvious from the following description and claim.

BRIEF DESCRIPTION OF THE DRAWINGS

The invention is described by the following embodiments with reference to the accompanying drawings, on which

DETAILED DESCRIPTION

Figure 1:
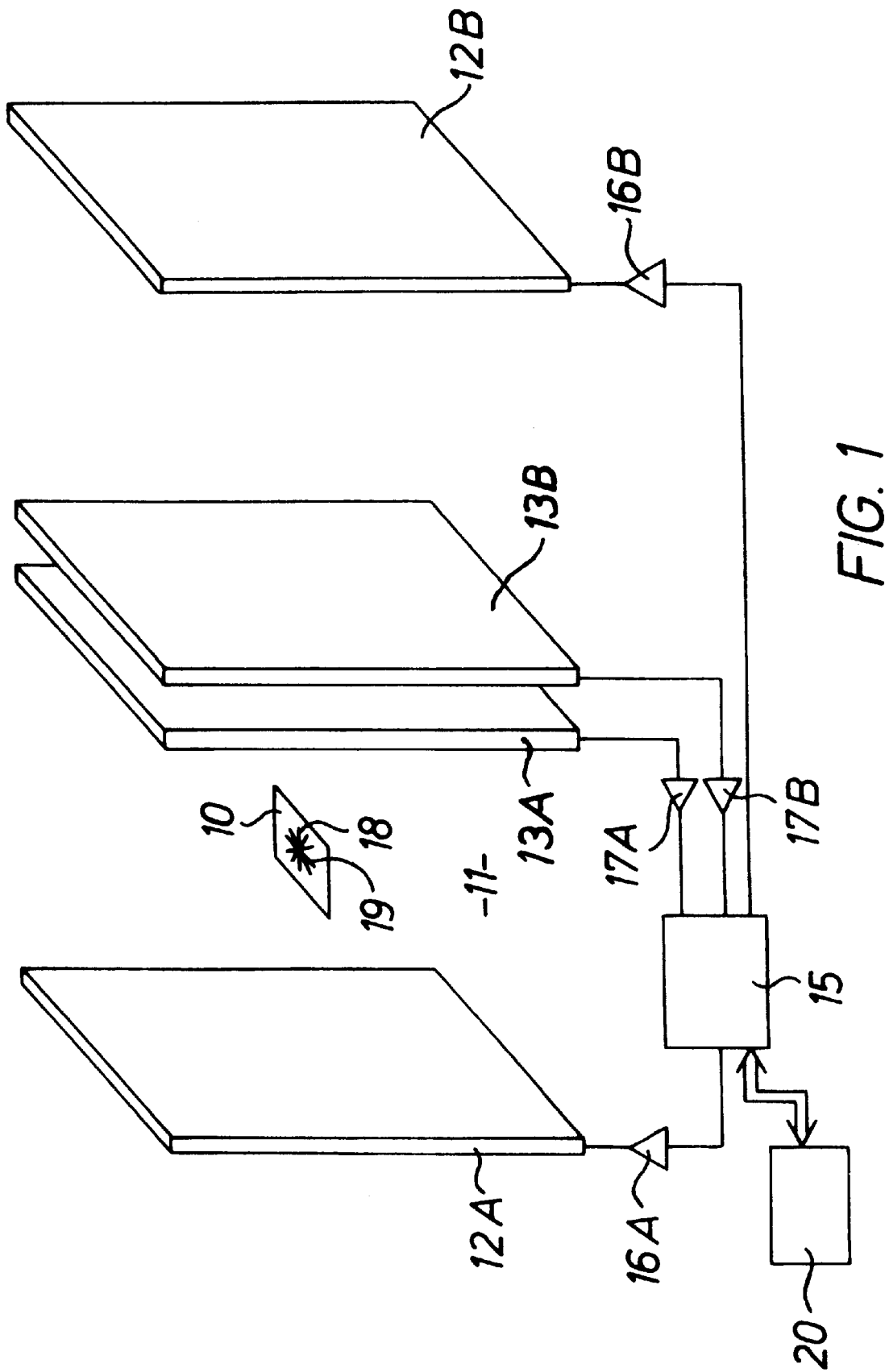
FIG. 1 is a schematic perspective view of an arrangement for carrying out the method according to the invention.

In a preferred embodiment two excitation means 12A and 12B are connected to an electronic controller 15 via two driver and amplifier units 16A and 16B. The excitation means 12A and 12B are formed as magnetic coils, which are parallelly and coaxially arranged with respect to each other. By this an interrogation zone 11 is obtained between the excitation coils with a symmetry plane with respect to the excitation field generated by the excitation coils. With equal signal strength from both of the excitation coils the symmetry plane is obtained at half the distance between the coils. Two detection means, preferably magnetic coils, are symmetrically arranged with one means at each side of the symmetry plane. The detection coils 13A and 13B are operatively connected to a central electronic controller 15. In the embodiment shown the detection coils 13A and 13B are connected to amplifier units 17A and 17B, respectively, which in turn are connected to the controller 15.

When the arrangement according to the figure is used, identical excitation signals are generated by the controller 15 in both the excitation coils 12A and 12B. The signals from both the detection coils 13A and 13B are amplified in the amplifiers 17A and 17B, and a signal corresponding to the difference between the recorded signals in the detection coils is determined in the central controller 15. If all the signals are generated fully symmetrically, the detected signal without the presence of any resonance elements will have a zero value, since the same signal is recorded in both the detection coils 13A and 13B.

The symmetry required does not necessarily have to be geometrical. It is also possible to accomplish the desired symmetry electronically. In order to compensate for errors and defects in the manufacture and/or assembly process, displacements and the like, or other sources of a lost symmetry in the excitation signal to the detection coils, it is furthermore possible to use active balancing. Such an active balancing may easily be accomplished, if the signal to each of the excitation coils is controlled individually. At chosen instants the level of the excitation signal in the difference signal from the detection coils may be monitored, and the excitation control may be adjusted, so that the difference signal with respect to the excitation signal will become zero again.

It is also possible to directly adjust the difference signal to balance with the use of, e.g., differential amplifiers at the detection side. Also other realizations with different coil configurations for the excitation and detection coils are possible within the scope of the invention.

Several magnetic elements 18, 19 are arranged with certain angular displacements with respect to each other on a label 10, which is placed in the interrogation zone 11. Possible angles between the elements constitute code values, and a certain set of angles constitutes an identification for the label. The angles are selected from a predetermined set of allowed angles.

When a label provided with an unknown combination of angles is going to be detected, the following steps are taken. The elements on the label are forced into self-oscillation, the resonance frequencies of the elements thereby being detectable. The resonance frequency of an element or elements is a function of the exposing magnetic field, or the magnetizing field strength, whereby the magnetic field exposing each element may be determined. It should be noted, that the magnetic field is a projection of the actual magnetic field on the element length extension and therefore constitutes a component of the actual magnetic field.

Figure 2:
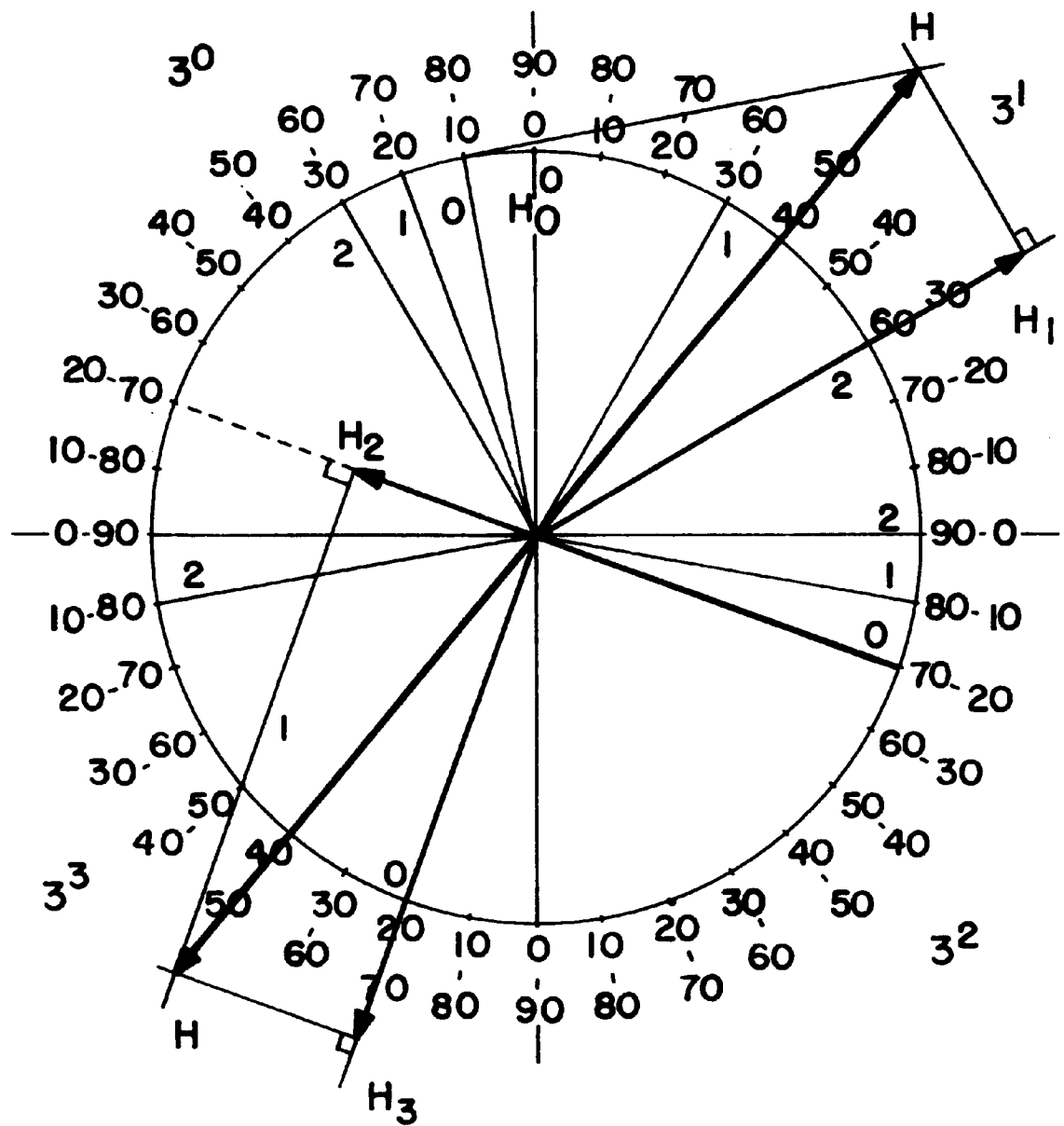
FIG. 2 is a graph illustrating the method for detection according to the invention.

Then all possible combinations of the magnetic field components are put together in a calculating unit 20. Possible combinations are determined by the predetermined sets of angles. Every component pair is used according to FIG. 2 to form a possible, actual magnetic field vector. Every possible combination gives rise to several magnetic field vectors, and taken together the number of possible magnetic field vectors becomes large.

In other words all possible difference angles between all code elements in a label are computed and matched against each other with respect to the projecting magnetizing field strength H. According to FIG. 2 each pair gives rise to a computed H-vector:

$H_0$–$H_1$, $H_1$–$H_2$, $H_2$–$H_3$, $H_0$–$H_2$, $H_1$–$H_3$, and $H_0$–$H_3$.

Each element direction, or actually the H-vector in the element direction, may be expressed according to the following:

$H_1 = H \cos x$ $H_0 = H \cos(\alpha - x)$, where $\alpha$ = the angle between the elements (and between the H-vectors projected on the elements); the a value is included in a set of angular values.

All elements in a label are exposed to the same H-vector, and consequently every correct code combination between all the determined ones should give the same H-vector value. Every combination of codes or angles, that gives the same H-vector, therefore may constitute a real label combination.

The method described above is then repeated with different magnetic field conditions so as to filter out any incorrect (i.e. not real) combinations. Every new situation (gradient or direction) implies several conditions, which have to be fulfilled for the combination to be correct. After a number of repetitions only the correct (real) codes remain, whereby all labels present in the interrogation zone, including the ones with identical sets of codes, are detected.

I claim:

1. A method for detecting codes on remotely detectable labels of the type carrying at least two elements having a length extension, the resonance frequency of an element depending on the strength of the component of an external magnetic field along the length extension of the element, the elements on each label being oriented in predetermined angular relations with respect to each other so as to provide a code for the label determined by said angular relations, wherein:

the labels are exposed to a sequence of different biasing magnetic fields covering an interrogation volume that is larger than a label; the resonance frequencies of the elements of labels in the interrogation volume being detected for every biasing magnetic field; the component of the biasing magnetic field vector along the length extension of each element is determined from the corresponding detected resonance frequency;

the method comprising:
  (a) determining all possible combinations of angular relations between pairs of elements of a label;
  (b) for a combination, computing resulting magnetic vectors from different pairs of said determined components of a particular biasing magnetic field, using the angular relations of the combination;
  (c) eliminating any combination not having the same resulting magnetic vectors computed for different pairs of elements; and
  (d) repeating steps (b) and (c), using different biasing magnetic fields, until only such combinations remain that correspond to actual codes of labels within the interrogation volume.

* * * * *